US012445194B2

(12) United States Patent
Sivakumar et al.

(10) Patent No.: US 12,445,194 B2
(45) Date of Patent: Oct. 14, 2025

(54) WORKLOAD MANAGEMENT BASED ON A PROXIMITY TO BODIES OF WATER AND LAND

(71) Applicant: International Business Machines Corporation, Armonk, NY (US)

(72) Inventors: Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 18/202,686

(22) Filed: May 26, 2023

(65) Prior Publication Data

US 2024/0396621 A1    Nov. 28, 2024

(51) Int. Cl.
*H04B 7/185* (2006.01)
*H04B 7/195* (2006.01)
*H04W 64/00* (2009.01)
*H04W 84/06* (2009.01)

(52) U.S. Cl.
CPC ..... *H04B 7/18513* (2013.01); *H04B 7/18582* (2013.01); *H04B 7/195* (2013.01); *H04W 64/003* (2013.01); *H04W 84/06* (2013.01)

(58) Field of Classification Search
CPC ............ H04B 7/18513; H04B 7/18582; H04B 7/195; H04W 64/003; H04W 84/06
See application file for complete search history.

(56) References Cited

U.S. PATENT DOCUMENTS

| | | | |
|---|---|---|---|
| 9,121,932 B2 | 9/2015 | Janky et al. | |
| 11,317,323 B2 | 4/2022 | Tatum | |
| 2015/0281336 A1* | 10/2015 | Beale | G06F 15/17331 709/201 |
| 2020/0267053 A1* | 8/2020 | Zheng | H04L 47/125 |
| 2023/0185879 A1* | 6/2023 | Han | G06N 20/00 706/12 |
| 2023/0268987 A1* | 8/2023 | Moyal | G06N 7/01 342/352 |

(Continued)

OTHER PUBLICATIONS

Dong et al, "A Computation Offloading Strategy in LEO Constellation Edge Cloud Network," Electronics, in special Issue of Satellite-Terrestrial Integrated Internet of Things, Jun. 28, 2022, 18 pages.

(Continued)

*Primary Examiner* — Raymond S Dean
(74) *Attorney, Agent, or Firm* — Zilka-Kotab, P.C.

(57) ABSTRACT

A computer-implemented method, according to one embodiment, includes generating a temporal mapping of positions of a first satellite with respect to predetermined portions of land of Earth and predetermined bodies of water of the Earth. The method further includes determining, based on the temporal mapping, a first job for the first satellite to offload to a first target device during a first period of time that a footprint coverage region of the first satellite is within a predetermined proximity to a first of the bodies of water. In response to a determination that the footprint coverage region of the first satellite is within the predetermined proximity to the first body of water, the first satellite is caused to offload the first job to the first target device.

20 Claims, 10 Drawing Sheets

(56) References Cited

U.S. PATENT DOCUMENTS

2024/0223269 A1* 7/2024 Govindassamy .. H04B 7/18584
2024/0259089 A1* 8/2024 Szigeti .............. H04B 7/18565

OTHER PUBLICATIONS

Tong et al, "Joint Offloading Decision and Resource Allocation in Mobile Edge Computing-Enabled Satellite-Terrestrial Network," Symmetry, vol. 14, Mar. 2022, 16 pages.

Tong et al, "Inter-Satellite Cooperative Offloading Decision and Resource Allocation in Mobile Edge Computing-Enabled Satellite-Terrestrial Networks," Sensors, vol. 23, Jan. 6, 2023, 17 pages.

Leng et al, "Collaborative Computing and Resource Allocation for LEO Satellite-Assisted Internet of Things, " Hindawi Wireless Communications and Mobile Computing, vol. 2021, Sep. 2021, 12 pages.

Anonymous, "Method and Apparatus for Dynamic Data Transformation Service for LEO Data Processing Locations," IP.com Prior Art Database, Technical Disclosure No. IPCOM000270992D, Sep. 24, 2022, 5 pages.

Condon, S., "CES 2019: Verizon showcases the potential of 5G with drones, Disney and more," ZDNET, Jan. 8, 2019, 7 pages, retrieved from https://www.zdnet.com/article/ces-2019-verizon-showcases-the-potential-of-5g-with-drones-disney-and-more/.

Tasevski, S., "5G and Drones," DroneBelow.com, Aug. 31, 2018, 2 pages, retrieved from https://dronebelow.com/2018/08/31/5g-and-drones/.

Mehar, P, "NASA Is About to Test a Giant Solar Drone That Broadcasts 5G," Tech Explorist, Mar. 9, 2019, 4 pages, retrieved from https://www.techexplorist.com/nasa-test-giant-solar-drone-broadcasts-5g/21473/.

Samsung, "Samsung, Cisco and Orange Demonstrate 5G-Powered Drone and Industrial Robot at MWC19," Samsung Newsroom, Feb. 26, 2019, 5 pages, retrieved from https://news.samsung.com/global/samsung-cisco-and-orange-demonstrate-5g-powered-drone-and-industrial-robot-at-mwc19.

Patel, N., "The Sky Is the Limit in 5G Game of Drones," eInfochips, Dec. 11, 2019, 7 pages, retrieved from https://www.einfochips.com/blog/sky-limit-5g-game-drones/.

Dong et al, "A Computation Offloading Strategy in LEO Constellation Edge Cloud Network," Electronics, in special issue of Satellite-Terrestrial Integrated Internet of Things, Jun. 28, 2022, 33 pages, retrieved from https://www.mdpi.com/2079-9292/Nov. 13, 2024.

Tong et al, "Inter-Satellite Cooperative Offloading Decision and Resource Allocation in Mobile Edge Computing-Enabled Satellite-Terrestrial Networks," Sensors, vol. 23, Jan. 6, 2023, 37 pages, retrieved from https://www.researchgate.net/publication/359217649.

* cited by examiner

WORKLOAD MANAGEMENT BASED ON A PROXIMITY TO BODIES OF WATER AND LAND

BACKGROUND

The present invention relates to processing jobs of a workload, and more specifically, this invention relates to workload management based on a proximity of a footprint coverage region with respect to bodies of water and land.

Communication networks typically include a plurality of communication devices that communicate with other communication devices via wireless signals. For example, communication devices may include, e.g., computers, cellular phones, fax machines, network enabled tablets, etc. These wireless signals are sometimes relayed via communication relay devices on Earth's surface, e.g., ground antennas, routers, modems, etc. In some cases, these wireless signals may additionally and/or alternatively be transmitted via connection requests that are output from communication devices to satellites.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds.

SUMMARY

A computer-implemented method, according to one embodiment, includes generating a temporal mapping of positions of a first satellite with respect to predetermined portions of land of Earth and predetermined bodies of water of the Earth. The method further includes determining, based on the temporal mapping, a first job for the first satellite to offload to a first target device during a first period of time that a footprint coverage region of the first satellite is within a predetermined proximity to a first of the bodies of water. In response to a determination that the footprint coverage region of the first satellite is within the predetermined proximity to the first body of water, the first satellite is caused to offload the first job to the first target device.

A computer program product, according to another embodiment, includes a computer readable storage medium having program instructions embodied therewith. The program instructions are readable and/or executable by a processing circuit to cause the processing circuit to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
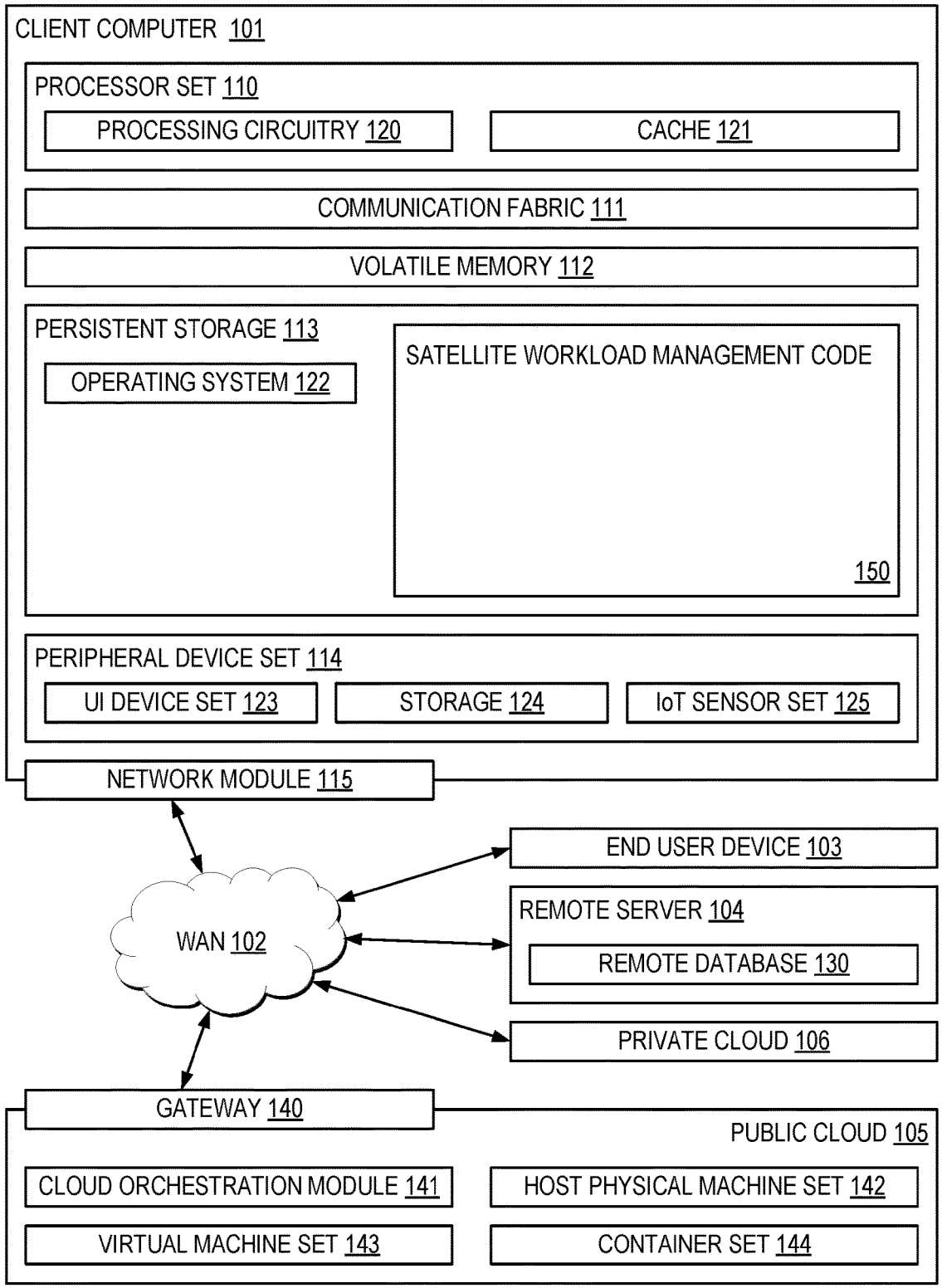
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for satellite workload management based on a proximity of a footprint coverage region of the satellite with respect to bodies of water and portions of land.

In one general embodiment, a computer-implemented method includes generating a temporal mapping of positions of a first satellite with respect to predetermined portions of land of Earth and predetermined bodies of water of the Earth. The method further includes determining, based on the temporal mapping, a first job for the first satellite to offload to a first target device during a first period of time that a footprint coverage region of the first satellite is within a predetermined proximity to a first of the bodies of water. In response to a determination that the footprint coverage region of the first satellite is within the predetermined proximity to the first body of water, the first satellite is caused to offload the first job to the first target device.

In another general embodiment, a computer program product includes a computer readable storage medium having program instructions embodied therewith. The program instructions are readable and/or executable by a processing circuit to cause the processing circuit to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as satellite workload management code of block 150 for satellite workload management based on a proximity of a footprint coverage region the satellite with respect to bodies of water and portions of land. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, communication networks typically include a plurality of communication devices that communicate with other communication devices via wireless signals. For example, communication devices may include, e.g., computers, cellular phones, fax machines, network enabled tablets, etc. These wireless signals are sometimes relayed via communication relay devices on the Earth's surface, e.g., ground antennas, routers, modems, etc. In some cases, these wireless signals may additionally and/or alternatively be transmitted via connection requests that are output from communication devices to satellites.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds.

Satellites typically orbit the Earth in order to assist in the communication networks, such as those described above. The altitude at which a satellite orbits the Earth may depend on the type and components of a satellite. For example, a low Earth orbit (LEO) is, as the name suggests, an orbit that is relatively close to the Earth's surface. For example, these orbits are typically performed at an altitude of less than 1000 kilometers (km) but may be as low as 160 km above the Earth's surface. This is relatively low compared to the orbits of other satellites, but still relatively very far above the Earth's surface. Unlike satellites in geostationary orbit (GEO) that must always orbit along the Earth's equator, LEO satellites do not always follow a particular path around the Earth in the same way. Rather a plane of an orbit may be tilted with respect to the equator, and therefore there are relatively more available routes for satellites in LEO.

LEO satellites are revolving around the Earth at relatively lower altitudes than geo-stationary satellites, and hence LEO satellites are not stationary with respect to Earth's movement. Because the movement of LEO satellites can be observed from Earth's surface, and LEO satellites are relatively much closer to Earth's surface than geo-stationary satellites, to maintain the rotation equilibrium, the speed of LEO satellites is a metric which relatively largely impacts the footprint region when LEO satellites are used for direct connection purposes. This also means that a footprint coverage region of a LEO satellite is fairly limited in that coverage timelines are relatively shorter proportional to a speed that the LEO's are orbiting Earth's surface. For this reason, multiple LEO satellites may be orbiting the plane which acts as a mesh to offer continuous coverage for a given area. As will be described in greater detail elsewhere below, LEO satellites in such a mesh can be caused and/or configured to communicate with one another via inter-satellite links which serve as a relatively high speed network line between the satellites.

In approaches in which LEO satellites directly serve user devices, there is no conventional process that predicts a workload of a given LEO satellite based on a servicing region of a landmass that a LEO satellite is passing over, and moreover orbital movements with respect to geographical landmarks such as land and bodies of water are not considered for determining whether a satellite should offload work from other satellite processes (jobs submitted) in the mesh. Nearly 70% of the Earth's surface area is covered by water and only around 30% of the Earth's surface area is landmass. This means that 70% of a footprint coverage region of a LEO satellite may be over oceans of the Earth where there are no target devices to connect to for such satellites.

Accordingly, conventional techniques do not provide a mechanism to utilize satellite processing capabilities to consider orbits and next land mass that a footprint coverage region of a LEO satellite will pass over for determining workload requirements. Accordingly, workload allocations among conventional satellites are relatively inefficient as at least some satellites are assigned workloads as a footprint coverage region the satellite passes over areas that do not contain target devices that have a need to connect to the satellite.

In sharp contrast to the deficiencies of the conventional techniques described above, the embodiments and approaches described herein enable techniques that work with satellite connection processors, and more specifically LEO satellite connection processors, to identify physical characteristics of the satellites such as, e.g., orbital speed, altitude, motion characteristics, orbit trajectory footprint regression, etc., and map these characteristics with other surface characteristics to determine knowledge about coverage areas on land masses of the Earth's surface. These techniques further collect information about landmasses and device connection, manipulate a next serving location dynamically, report calculated idle times to the devices in a determined mesh and offer offloaded processing to optimize the computational processing in space.

In some preferred approaches, the techniques include operations run inside the LEO satellite which may initiate itself and start collecting the information from various physical level interfaces. These interfaces may include, e.g., motion sensors, height sensors and other physical characteristics gathering. This information is added into metadata mapper objects which are then used to calculate exact positional references for LEO satellites in a plane. In some approaches, the techniques then collect information and calculate a speed of a given satellite, direction, and trajectory regions thereof. The coverage footprint regions are then calculated and appended with Earth's surface where the satellite is covering the ground footprint. In some approaches, this is performed by injecting the ground surface coordinate map with the satellite GEO location and an altitude of the satellites. Per physics, a cone structure with an altitude of the satellite may be generated, and based on this a location of the satellite with their geo-based coordinates in terms of latitudinal and/or longitudinal mappings may be determined. Once the latitudinal and/or longitudinal mappings are created for the satellite, positions of land and ocean regions may be identified by integrating Earth's graphs into the mapping. Motion maps may be integrated to identify the land-based footprint or sea-based footprint of a given satellite. Once a footprint region is collected, the timelines for which the next land-based regions will arrive are determined based on an orbit and the trajectory speed of the satellite. There are some LEO satellites which have an elliptical orbit. In such cases, dynamic measurements may be performed to look for a next ground region, e.g., land mass of Earth, for the LEO satellite to serve. Based on the identified next land mass, a determination may be made as to how long until a footprint coverage region of the satellite will be over the identified next land mass. Until the footprint coverage region of the satellite is over the identified next land mass this time, the footprint coverage region of the LEO satellite will be over a body of water, e.g., an ocean, during which there is not any target connections made to the LEO satellite for data processing. Accordingly, the LEO satellite is underloaded and/or not loaded during this period of time. To leverage this additional bandwidth, the LEO satellite is, in some approaches, caused to create and broadcast a signal to other LEO satellites in the mesh. Such a broadcast message may, in some approaches, include timelines and processing capacity details, e.g., processor configurations, RAM, etc., which may be used by the other LEO satellites in the mesh to offload the processing. The peer LEO satellite in the mesh is known to the lower layers and therefore this list may be enquired and/or a broadcast message may be sent to all the LEO satellites in the mesh. The peer LEO satellites receive the message and decode the capabilities along with the timelines which are then used to understand the processing timelines of a job that can be transferred to the free LEO satellites. A determination may be made as to how much work a given LEO satellite should perform based on a required capacity, and then the LEO satellite may be caused to perform a handshake and submit the job for offload data transfer, e.g., to another LEO satellite. Because an amount of free time may be published upfront, peer LEO satellites may be caused to decide which jobs to perform in a way that offers additional flexibility to peer LEO satellites with an ability to understand and schedule the jobs in a way that efficiently uses free resources within the mesh of LEO satellites. These techniques are described in further detail in several embodiments below, e.g., see method 200.

Figure 2:
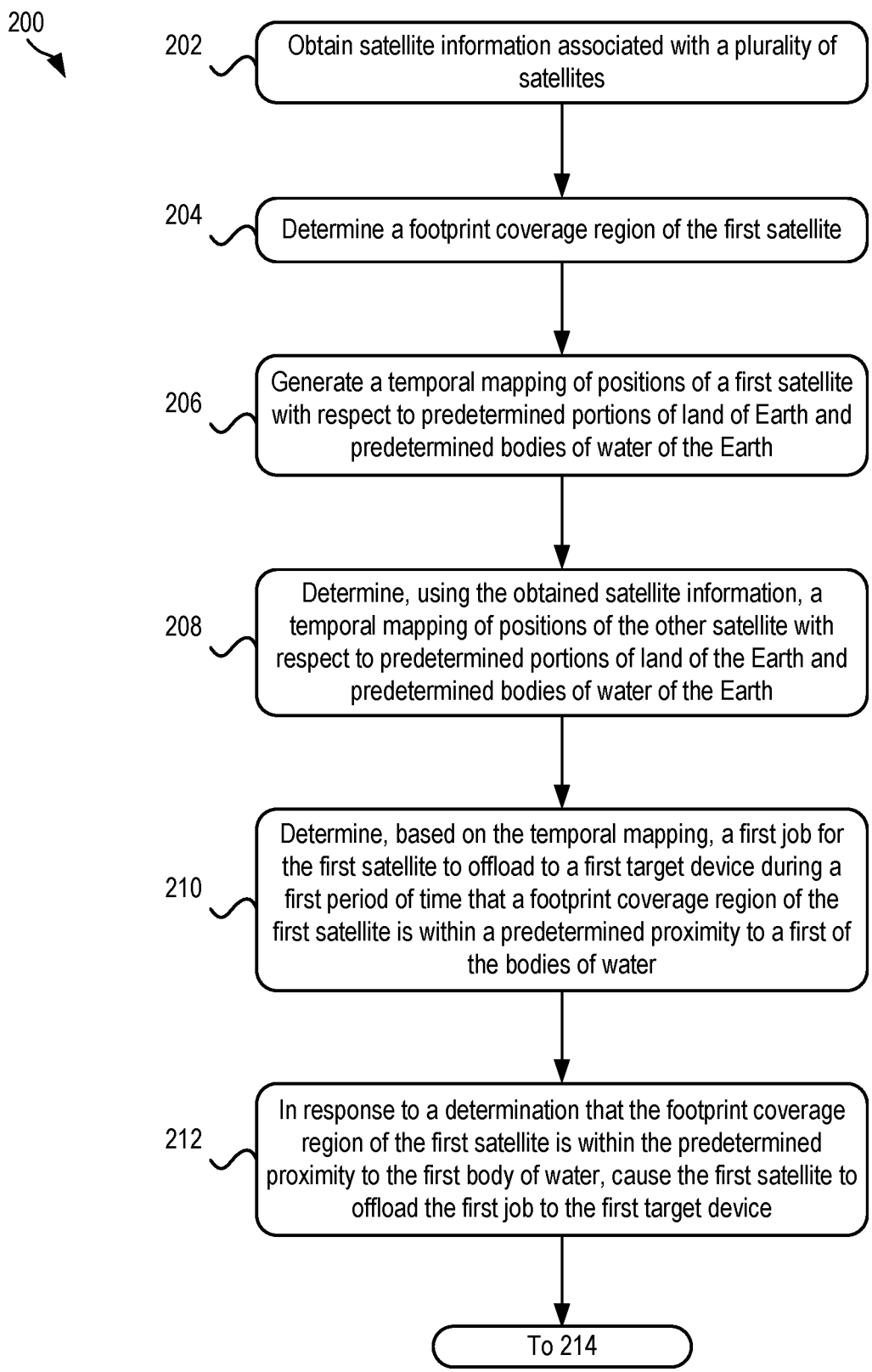
FIG. 2 is a flowchart of a method, in accordance with one embodiment of the present invention.
Figure 2:
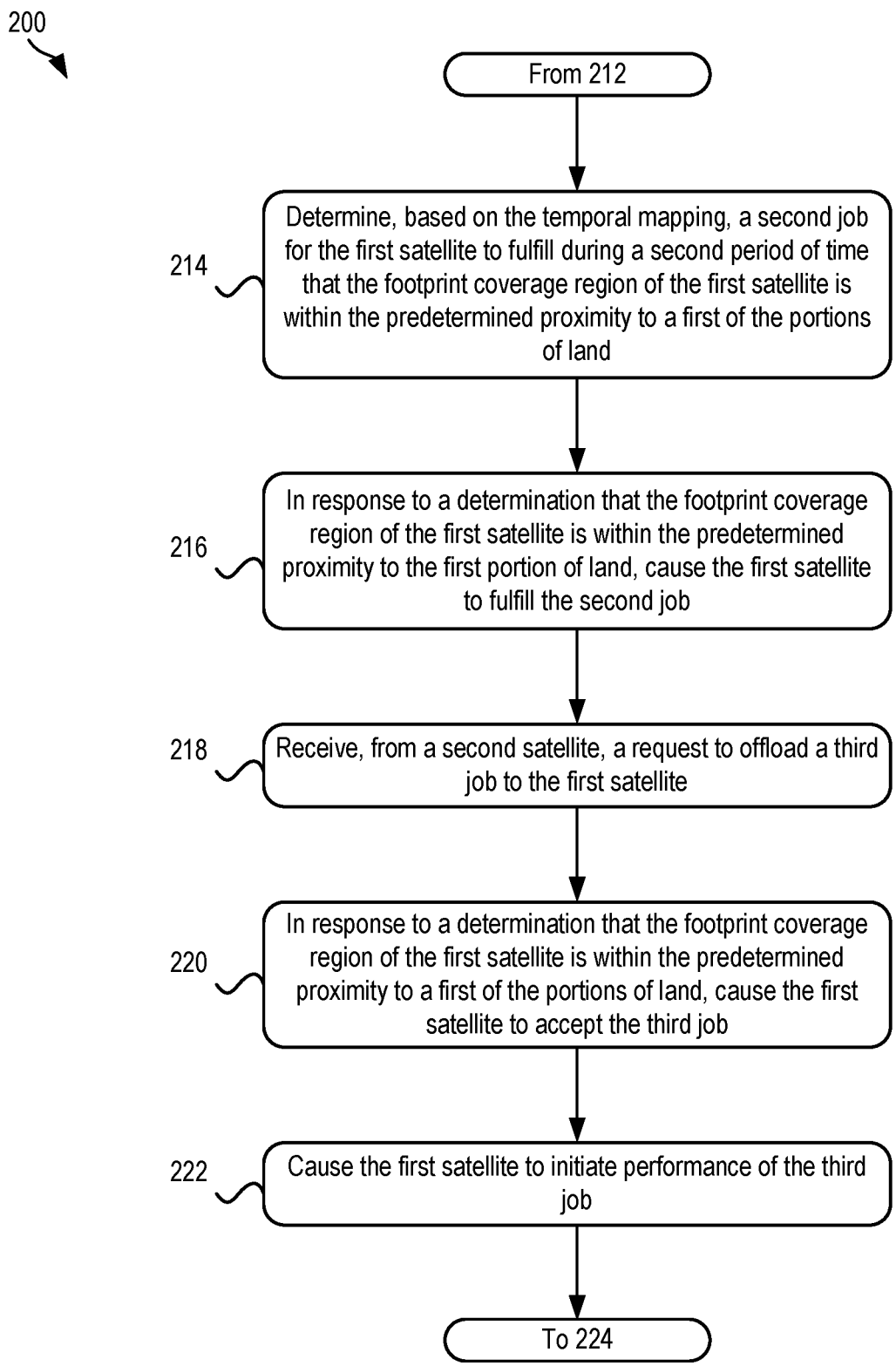
Figure 2:
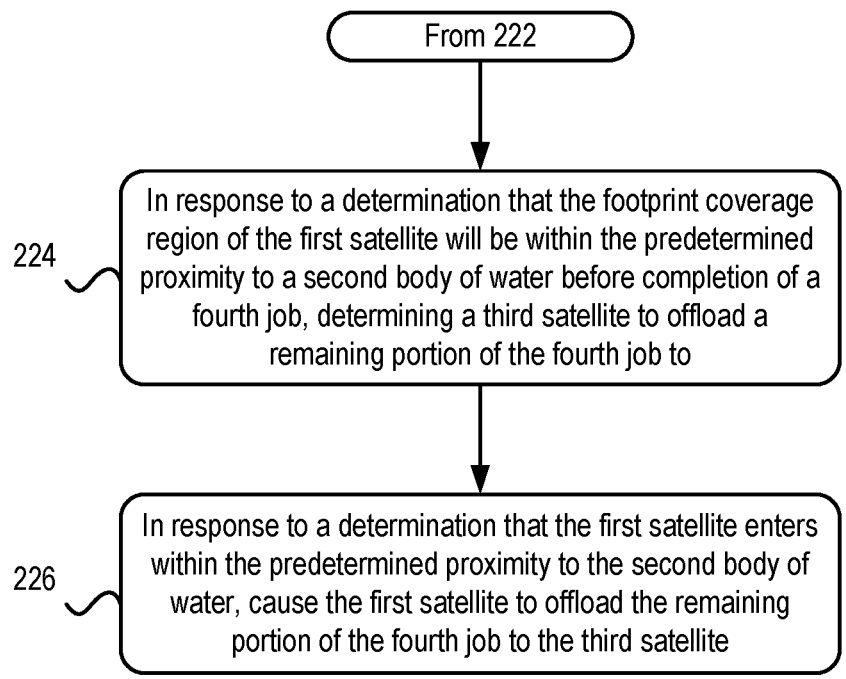

Now referring to FIG. 2, a flowchart of a method 200 is shown according to one embodiment. The method 200 may be performed in accordance with the present invention in any of the environments depicted in FIGS. 1-8, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Various approaches of method 200 are described to be performed with respect to Earth. For example, in some approaches, operations are described with respect to predetermined portions of land of Earth and predetermined bodies of water of the Earth. It should be noted that, in some other embodiments, various operations described herein may be performed with respect to other planets, e.g., a planet that has one or more satellites orbiting the planet and that has one or more bodies of water and one or more portions of land. It should be noted that, in some other embodiments, various operations described herein may be performed with respect to moons, asteroids, etc., that have one or more bodies of water, one or more portions of land and one or more orbiting satellites.

It may be prefaced that method 200 may be implemented in a known type of communication network that would become apparent to one of ordinary skill in the art upon reading the descriptions herein. For context, such a communication network may include a plurality of communication devices, e.g., computers, cellular phones, fax machines, network enabled tablets, etc. These communication devices may be user devices, e.g., nodes, that are used by one or more users. Furthermore, in some preferred approaches, the communication network may include one or more satellites that are, at least in some part of the satellite(s) orbit, configured to communicate with the communication devices. Note that although some approaches described herein refer to "satellites," in one or more of such approaches, at least one of the satellites is preferably a LEO satellite. One or more internet networks and/or private networks may additionally and/or alternatively be included in the communication network, and thereby, at least in some part of the satellite(s) orbit, configured to communicate with the satellite(s).

Communication within the network may, in some approaches, be, at least in part, performed using connection requests. Depending on the approach, connection requests of the devices may be directly and/or indirectly routed to one of the satellites and may include, e.g., monitoring internet of things (IoT) connection requests, fixed corporate network backhaul (alternative) connection requests, mobile network connection requests, mobile broadcast connection requests, backhaul connectivity connection requests, emergency communication connection requests, tracking related connection requests, remote community connection requests, power network connection requests, aeronautical broadband connection requests, remote control connection requests, etc. The connection request of a first device may be directly sent from the first devices to a first of the satellites. In another approach, the connection request of a first device may be indirectly sent from the first device to a second of the satellites, e.g., sent directly to the first satellite and the first satellite may handoff the connection request to the second satellite, sent from the first device to a known type of relay component on the Earth's surface that then outputs the connection request of the first device to the second satellite, etc.

Operation 202 includes obtaining satellite information associated with a plurality of other satellites. In some preferred approaches, at least one of the satellites is a LEO satellite, the first satellite. In some other approaches, a majority of the satellites may be LEO satellites, all of the satellites may be LEO satellites, etc.

The satellite information may be obtained by a processing circuit that is located in a first of the satellites and/or by a processing circuit that is in communication with at least one of the satellites. In such an approach, the processing circuit of the satellite may be configured to offload jobs from the satellite (e.g., for another satellite to perform) and/or accept jobs from other satellites. Furthermore, in such an approach, the processing circuit may additionally and/or alternatively be configured to use the satellite information pertaining to other satellites to determine one or more metrics associated with the other satellites. In some other approaches, the satellite information may be obtained by a computer that is in communication with one or more of the satellites. The satellite information may, in some approaches, include, e.g., identifiers (IDs) of satellites, predetermined metrics associated with the satellites, software versions being run on the different satellites, etc. In some approaches the predetermined metrics associated with the satellites include, e.g., a current altitude of a satellite, a trajectory of a satellite, orbital plane information of a satellite, an average moving speed of a satellite, an orbital path of a satellite, a shape of a satellite's orbital path, etc.

The satellite information associated with the plurality of other satellites may be obtained from and/or as data structures of the satellites. Upon instantiation, the data structures may be loaded to a service instance, and predefined data collection resources may be triggered to send data streams from an associated satellite to other satellites orbiting the Earth. For context, data streams may be sent between satellites, a satellite and a target device, e.g., such as transmitted between a satellite and a target device on Earth's surface and/or where another satellite is the target device, e.g., a LEO satellite target device, as part of a job of a workload. In some approaches, these jobs may be application storage instances, e.g., such as where at least one of the satellites has obtained data that is to be transmitted to and stored by a target device for a client. In some approaches, receiver data locations may be identified and provisioned within the obtained satellite information. Communication with the application storage instances may be made and statuses are enquired from the target devices, e.g., ready to receive data, not ready to receive data, etc.

In some approaches, in order to establish communication paths between different satellites and/or between satellites and target devices on Earth's surface, resource capitals may be provisioned for a service using insertions to a softwarization management plane and virtual network functions may be triggered to start the data transmission over an established transmission line. Infrastructure application programming interface (API) instances of the satellites may, in some approaches, be initiated, and handshaking may be performed that is further used to transmit a data requirement signal and recognition of an event by an orchestration plane of an infrastructure that supports the satellites.

Satellite infrastructure APIs are, in some approaches, invoked to obtain the satellite information. For example, in some approaches in which the satellite information includes physical parameters, e.g., a current altitude, a footprint region, a trajectory, orbital plane information, an average moving speed of eNodeBs of a satellite, etc., operation 202 may include invoking satellite infrastructure APIs.

In some approaches, only a subset of the satellites associated with the obtained satellite information are predetermined to be allowed to process jobs in method 200, e.g., only a portion of the satellites are allowed to handle offload processing requests. In some other approaches, only a subset of the satellites orbiting earth are to be considered in method 200 for processing jobs. Accordingly, information from all satellites in a predetermined mesh, e.g., a predetermined LEO satellite mesh, which are predetermined to be allowed to handle offload processing request from other endpoints are enquired during the obtaining of the satellite information. In some approaches, the information includes LEO satellite universally unique identifiers (UUIDs), software eNodeB IDs and/or other static metadata that can be derived from configurable parsing approaches that would become apparent to one of ordinary skill in the art after reading the descriptions herein. In some approaches, orbital characteristics locational identifiers are loaded during this process of identifying the subset of satellites and information associated with the subset of satellites. The location identifiers are, in some preferred approaches, mapped with their earth centric geo-locations and saved into metadata mappers.

Subsequent to obtaining information from a plurality of satellites that are capable of being used to complete jobs of a predetermined and/or ongoing workload, the obtained information may be used to determine movement of the satellites with respect to Earth. For example, the obtained satellite information may be used to determine a trajectory of individual satellites. In some approaches, the trajectory of a given satellite may be determined, e.g., based on tracked historical orbital information associated with the satellite, based on a current tracking of the satellite, from a table of predetermined metrics in the obtained information, etc. The determined trajectory of a satellite, e.g., the first satellite, may then be mapped against a geo-location where application processing is involved, e.g., the location of a target device that is configured for receiving an offload data transfer from the satellite. This information may, in some approaches, be saved into a metadata mapper of objects which may be used to calculate an exact positional reference of the satellite in a predetermined plane of satellites that includes at least the first satellite. A check may additionally and/or alternatively be performed, in some approaches, to determine target device connection processing requirements in a coverage footprint of the satellites.

Method 200 additionally and/or alternatively includes collecting additional information and/or using the collected satellite information for calculating a speed, direction, and trajectory region of the satellite. It should be noted that although various operations described herein are performed from the perspective of a first satellite and/or performed by a first satellite, such operations may additionally and/or alternatively be performed with respect to and/or by one or more other satellites, e.g., a second satellite, a third satellite, a fourth satellite, a fifth satellite, etc.

Operation 204 includes determining footprint coverage region(s) of one or more of the satellites. For context, the footprint coverage region of a satellite is an area of Earth below the orbiting satellite that the satellite is within range of connecting to one or more target devices located on the area of Earth. The area of Earth below the orbiting satellite that makes up the footprint coverage region of the satellite may depend on communication hardware of the satellite. For example, in some approaches, a first LEO satellite may have a relatively larger footprint coverage region than a footprint coverage region of a second LEO satellite as a result of the second LEO satellite having relatively more outdated communication hardware, e.g., signal broadcasting hardware of a processing circuit. The footprint coverage region of a satellite may be determined based on metrics associated with the satellite, e.g., metrics from the obtained satellite information. For example, a footprint coverage region of a first satellite may be determined based on metrics associated with the first satellite, e.g., a current altitude, a trajectory, orbital plane information and an average moving speed. Techniques for determining a connectivity and/or communication range of a satellite, based on metrics associated with the satellite, that would become apparent to one of ordinary skill in the art after reading the descriptions herein may be used. The footprint coverage region of a given satellite is used to determine candidate jobs for the satellite to fulfill, e.g., in response to a determination that the footprint coverage region of the satellite is within range of a target device for an offload data transfer, as will be described in greater detail below.

A temporal mapping of at least some of the satellites is generated with respect to their orbit around Earth. For example, in some approaches, a temporal mapping of positions of a first satellite with respect to predetermined portions of land of Earth and predetermined bodies of water of the Earth is generated, e.g., see operation 206. For context, in some preferred approaches, the predetermined portions of land are continents of the Earth. In some other approaches, the predetermined portions of land are a predetermined combination of one or more of, e.g., islands of at least a predetermined size, landmasses that have at least a predetermined number of target devices thereon that are configured for offload data transfer, portions of land that have a predetermined landmark thereon, etc. The predetermined bodies of water are, in some approaches, oceans of the Earth. In some other approaches, the predetermined bodies of water may additionally and/or alternatively include a lake of at least a predetermined size, a portion of ice of at least a predetermined size, etc.

In some approaches, the temporal mapping of the first satellite is generated by appending the footprint coverage region of the first satellite with Earth's surface on a predetermined map, e.g., to indicate the footprint coverage region of the first satellite as the first satellite traverses with respect to Earth's surface. In some approaches, this appending may be performed by injecting a ground surface coordinate map with satellite geographical location information and an altitude of the satellite.

Operation 208 includes determining, using the obtained satellite information, a temporal mapping of positions of the other satellites with respect to the predetermined portions of land of the Earth and the predetermined bodies of water of the Earth. In some approaches, determining, using the obtained satellite information, a temporal mapping of positions of the other satellites includes extrapolating a temporal mapping from the obtained satellite information, e.g., such as where the temporal mapping associated with the other satellites is already included in the obtained satellite information. In another approach, the temporal mapping of positions of the other satellites is determined using similar techniques to those used to generate the temporal mapping of positions of the first satellite.

In some approaches, generating the temporal mapping of positions of satellites with respect to the predetermined portions of land of the Earth and the predetermined bodies of water of the Earth may include identifying positions of the predetermined portions of land and the predetermined bodies of water, and integrating graphs of the Earth into another graph that includes mappings of longitudinal versus latitudinal travel of the satellites. In some approaches, this includes integrating predetermined motion maps to identify a land-based footprint and/or a sea-based footprint.

With the temporal mappings established, one or more operations may be performed to determine which of the satellites are to fulfill jobs of a predetermined workload, and when the satellites are to fulfill the jobs. Operations for determining a distribution and/or offloading strategy for these jobs with respect to the satellites are described below, e.g., see operations 210-226. It may be prefaced that during periods of time that a footprint coverage region of a given satellite is within a predetermined proximity to bodies of water, the satellite is out of range for connecting to a target device of an offload data transfer and thereby out of range for fulfilling offload data transfers. Accordingly, during these periods of time, satellites are preferably caused to not accept jobs and/or offload jobs to other satellites determined to have a footprint coverage region within the predetermined proximity to land of the Earth. Note that the predetermined proximities described herein may vary depending on the approach. In some approaches, the predetermined proximity is a predetermined number of miles, e.g., one mile, five miles, ten miles, etc.

Operation 210 includes determining, based on the temporal mapping, a first job for the first satellite to offload to a first target device during a first period of time that a footprint coverage region of the first satellite is within a predetermined proximity to a first of the bodies of water. In some preferred approaches, the first target device is one of the other satellites, which may be a LEO satellite. In other words, in some approaches, in response to a determination that the first satellite has a trajectory that will cause the footprint coverage region of the first satellite to intersect the first of the bodies of water, at least a first job that is currently assigned to the first satellite may be determined to allow for the first job to be offloaded to another satellite that is better geographically positioned to fulfill the first job. The other satellite that the first job is offloaded to preferably includes a satellite that is determined to have a trajectory that will cause the footprint coverage region of the other satellite to be positioned over land of the Earth at the offload time or be positioned over land of the Earth within a predetermined amount of time after the offload time. As a result of causing jobs currently assigned to a first satellite, that will be located over a predetermined body of water, to be reassigned to a second satellite that is able to fulfill the job based on the second satellite being positioned over a predetermined portion of land of Earth, a throughput efficiency of the workload relatively improves. For example, it may be noted that the offloaded job would otherwise be unnecessarily delayed in the event that the job was not caused to be offloaded to a satellite capable of performing the job based on a geographical position of the second satellite.

The footprint regions of the satellites may be referenced in the temporal mappings, and a timeline for which a satellite that will receive the offloaded job may be determined. This determination may include determining when other satellites will have a footprint coverage region that is over predetermined portions of land beginning at a time that the footprint coverage region of the first satellite is within a predetermined proximity to the first body of water. For example, these determinations may be based on a trajectory and speed of the satellites. More specifically, in some approaches, the elliptical orbit of the satellites may be considered to determine ground regions of Earth that the other satellites will next be serving based on a determination that the footprint coverage regions of such satellites will pass over such ground regions.

In response to a determination that the footprint coverage region of the first satellite is within the predetermined proximity to the first body of water, the first satellite is caused, e.g., instructed, to offload the first job to the first target device, e.g., see operation 212. In some approaches, the first target device is determined from the temporal mappings and/or the satellite information. For example, the satellite for offloading the first job to, e.g. the second satellite, may, in some approaches, be selected for offloading the first job to in response to a determination that a footprint coverage region of the second satellite is within a predetermined proximity to a first of the portions of land during a first period of time, e.g., the period of time that the footprint coverage region of the first satellite is within the predetermined proximity to the first of the bodies of water. The first period of time may, in some approaches, continue for at least a second predetermined period of time. In other words, the first job is preferably not offloaded to the second satellite in response to a determination that the footprint coverage region of the first satellite will be within the predetermined proximity to the first of the bodies of water for only a relatively short period of time, e.g., less than the second predetermined period of time. Instead, in some approaches, the first job is preferably offloaded to the second satellite in response to a determination that a trajectory of the footprint coverage region of the second satellite continues over at least a first portion of the land for at least a predetermined period of time.

In some other approaches, method 200 includes causing the first satellite to output a signal in order to determine a second satellite for offloading the first job to. For example, the first satellite may be caused, e.g., instructed, to create and broadcast a signal to the other satellites, e.g., to all other satellites in the mesh. The broadcast signal may be a message that indicates details associated with the job that is being offloaded from the first satellite. For example, in some approaches, the broadcast signal indicates the timeframe that the first job needs to be completed in. The broadcast signal may additionally and/or alternatively include processing capacity details, e.g., processor configurations, RAM size, etc., that a candidate satellite to which the first job will be offloaded must have and/or that can be used by the other satellite for fulfilling the job. In some approaches, the first satellite is known to the lower layers in the mesh, and therefore these details may be enquired. One or more of the other satellites, e.g., peer satellites in the grid, may receive the signal as a message. In some approaches, the signal is transmitted by the first satellites in a predetermined encrypted format. Accordingly, the signal may be decoded using the predetermined format to determine the capacity details, e.g., capabilities that satellite that the job is offloaded to will need to perform the job, along with timelines which may be used to understand processing timelines of the first job before the first job can be transferred to one of the free satellites.

Based on the trajectory of the first satellite, in some approaches, a determination may be made as to a next portion of land that the footprint coverage region of the first satellite will pass over. In some approaches, the time that the footprint coverage region of the first satellite will pass over the determined next portion of land is determined. Until the determined time, the first satellite passes over bodies of water, and therefore, target connections are not made to the first satellite for data processing, e.g., the first satellite is caused to not accept and/or take on any jobs. Accordingly, the first satellite is underloaded and/or not loaded during the period of time that the footprint coverage region of the first satellite passes over one or more bodies of water.

Although the first job is described above to be offloaded during a first period of time, one of the other satellites may be selected as the first target device for offloading a second job to during a second period of time. In other words, the temporal mapping may be ongoingly used to determine target devices for offloading jobs to ensure that satellites having footprint coverage regions that are positioned over the portions of land are offloaded jobs and/or assigned jobs rather than such jobs being delayed from being performed based on a satellite having a footprint coverage region that is positioned over one or more bodies of water.

In some approaches, in response to a determination that the footprint coverage region of the first satellite is not within the predetermined proximity to the first body of water and will not be within the predetermined proximity to the first body of water for a period of time that the first satellite is estimated to take to complete the first job, the first satellite may be caused, e.g., instructed to initiate performance of the first job.

Various operations above detail a first job being offloaded by the first satellite in response to the first satellite having a footprint coverage region that is positioned over and/or is scheduled to be positioned over one or more bodies of water. In some approaches, method 200 may additionally and/or alternatively include causing a satellite to fulfill at least some available jobs during a period of time that the footprint coverage region is positioned over a portion of land. For example, operation 214 includes determining, based on the temporal mapping, a second job for the first satellite to fulfill during a second period of time that the footprint coverage region of the first satellite is within the predetermined proximity to a first of the portions of land. The second job may, in some approaches, be determined from a predetermined workload, e.g., a predetermined job queue, that at least the first satellite has access to and is authorized to claim jobs from. In some preferred approaches, the second job is a job that is determined, e.g., estimated, to be of a size that the first satellite is able to process and fulfill before the footprint coverage region of the first satellite is positioned over one or more bodies of water.

In response to a determination that the footprint coverage region of the first satellite is within the predetermined proximity to the first portion of land, e.g., the footprint coverage region of the first satellite is currently over a body of water but is within a predetermined distance from the first portion of land, the first satellite is caused, e.g., instructed, to claim and/or fulfill the second job, e.g., see operation 216.

As opposed to selecting a job from a predetermined job queue or other lists, in some approaches, the first satellite accepts a job, e.g., a third job, in the process of another satellite offloading the third job. For example, operation 218 includes receiving, from a second satellite, a request to offload a third job to the first satellite. The request to offload the third job to the first satellite may, in some approaches, be received by the first satellite as a signal that is transmitted by the second satellite. In response to receiving the request from the second satellite, a determination may be made as to an amount of work, e.g., processing operations of the job, that the first satellite is capable of taking on. In some approaches, the amount of work that a satellite is capable of taking on may be compared with a required capacity, e.g., an indication in the request that specifies a degree of processing that completing the job consumes.

In some other approaches, the first satellite may access a request, to offload a third job to the first satellite, on a predetermined database, e.g., such as a predetermined database that the first satellite accesses upon the footprint coverage region of the first satellite coming within the predetermined proximity to a portion of land.

A determination may be made as to whether the first satellite should accept the third job. For context, such a determination may be made to ensure that the first satellite does not accept the third job where the footprint coverage region of the first satellite is scheduled to be positioned over a body of water immediately thereafter, as this may result in a delay of the third job being fulfilled. In response to a determination that the footprint coverage region of the first satellite is within the predetermined proximity to a first of the portions of land, the first satellite may be caused, e.g., instructed, to accept the third job, e.g., see operation 220. In some approaches, the first satellite accepts a job by performing a handshake with the offloading satellite, subsequent to which, the offloading satellite may submit the job for offload data transfer. In some approaches, as a result of being offloaded to the first satellite, the third job is transferred to the first satellite for a duration specified by the first satellite and/or the third satellite.

In some approaches, the first satellite may additionally and/or alternatively be caused, e.g., instructed, to accept the third job in response to a determination that a current trajectory of the first satellite will is expected to result in the footprint coverage region of the first satellite being positioned over a body of water for at least a predetermined amount of time from a current time, e.g., at least one hour, at least ten hours, at least one day, etc. Method 200 optionally includes causing, e.g., instructing a processing circuit of the first satellite to initiate performance of the third job, e.g., see operation 222. In some approaches, the first satellite may process the third job and send results of processing the third job back to the satellite that the third job was offloaded from. The results of the third job may additionally and/or alternatively be transmitted to a land based target device that is associated with a predetermined database.

Acceptance of a job by a satellite may, in some approaches, be performed only subsequent to a determination that the satellite will be able to complete the job before a footprint coverage region of the satellite is within the predetermined proximity to a body of water. In contrast, in some other approaches, a satellite may be caused to accept and initiate performance of a job, and potentially offload an uncompleted portion of the job thereafter. For example, in response to a determination that the footprint coverage region of the first satellite will be within the predetermined proximity to a second body of water (which may be different than the first body of water mentioned elsewhere herein) before completion of a fourth job, one of the satellites of the grid, e.g., a third satellite, may be determined for offloading a remaining portion of the fourth job to, e.g., see operation 224. In some approaches, a footprint coverage region of the third satellite may be ensured to be within at least a predetermined proximity to a predetermined portion of land upon the footprint coverage region of the first satellite entering within the predetermined proximity to the second body of water in order for the offload of the fourth job to be performed. In response to a determination that the first satellite enters within the predetermined proximity to the second body of water, the first satellite is caused to offload the remaining portion of the fourth job to the third satellite, e.g., see operation 226. In some approaches, offloading the remaining portion of the fourth job to the third satellite includes generating an indication of the completed and/or incomplete portions of the fourth job and outputting the indication to the third satellite. An indication of a target device that the completed fourth job is to be offloaded to, e.g., a land based target device having a predetermined associated database, may additionally and/or alternatively be provided to the third satellite by the second satellite during the offload of the fourth job.

The techniques described herein for LEO satellite datacenters and the mechanisms to send and receive information from LEO satellites directly via a communication network, enable considerable performance benefits. For example, applications and devices may be able to access data from LEO satellites directly. Because such devices are directly connected to LEO processing locations, the transmission latency is relatively very low due to omitted interference of intermediate network components. Furthermore, because LEO satellites orbit relatively closer to Earth than other satellites, the LEO satellites may be used for communication purposes where the devices, e.g., mobile devices, IoT devices, etc., on Earth are able to connect directly to the LEO satellites for making a data exchange (instead of earth based eNodeBs). This allows for relatively faster data transmission between networks to devices because they are directly connected to LEO satellites. This is particularly useful for 5G/6G capable mobile devices which may possess capabilities to connect to LEO satellite transceivers where the LEO satellites act as eNodeBs and serve connections to the target endpoints.

Further benefits enabled by the techniques described herein include the enablement of dynamically sensing a next coverage footprint timing based on a landmass and ocean-based coverage. Furthermore, utilization of free resources in space are relatively improved because available timelines among LEO satellites in the mesh are considered for job execution purposes. These techniques also enable a proactive loaning of resources considering the physical characteristics of orbital revolution around Earth. Inter-satellite links are also leveraged for offloading job execution, which enables a relatively efficient utilization of resources. Timeline-based job completion expectations from resource loaners may also be archived to enable further efficiencies as the techniques are ongoingly performed.

Figure 3A:
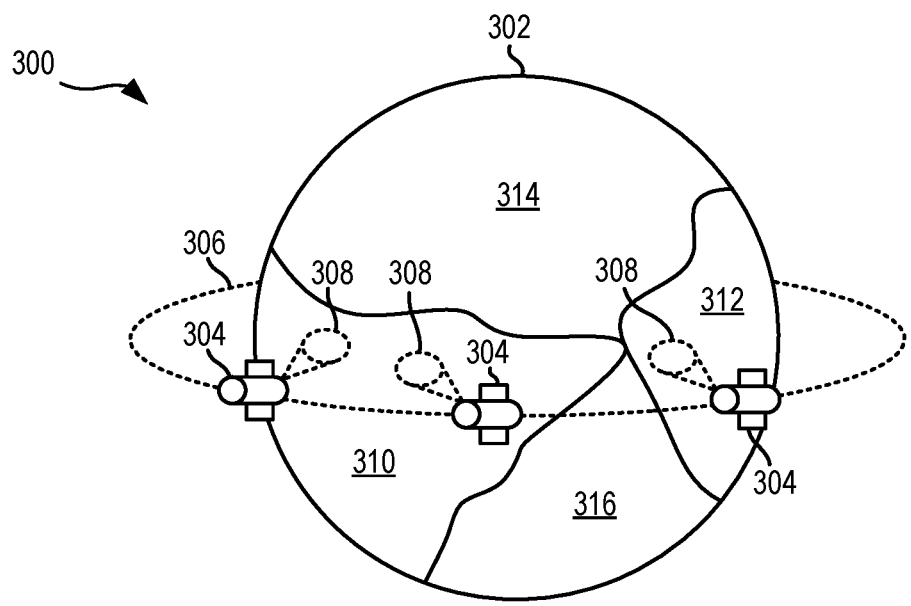
FIGS. 3A-3B are depictions of communication networks, in accordance with several embodiments of the present invention.
Figure 3B:
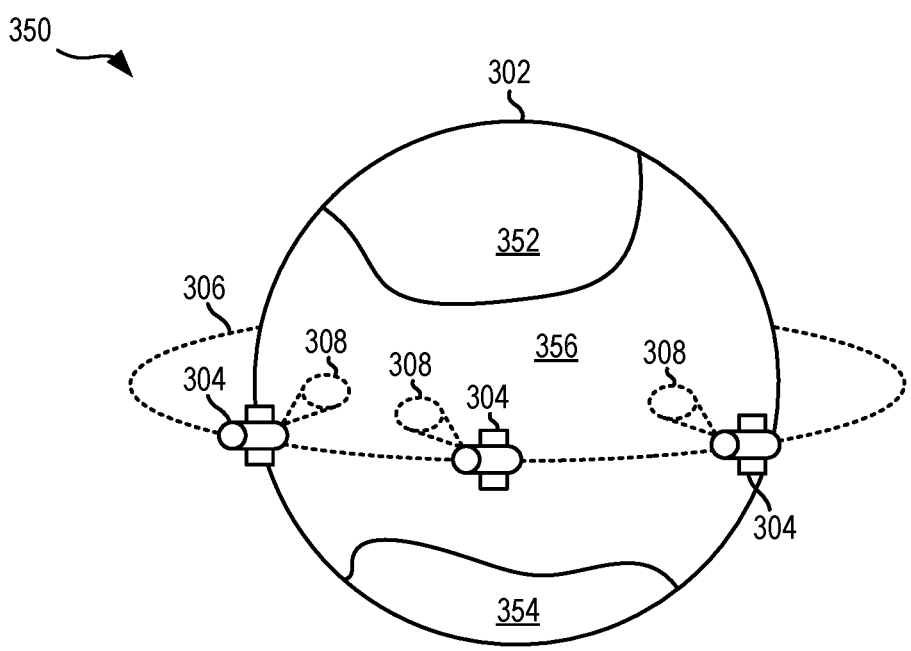

FIGS. 3A-3B depict communication networks 300 and 350, in accordance with one embodiment. As an option, the present communication networks 300 and 350 may be implemented in conjunction with features from any other embodiment listed herein, such as those described with reference to the other FIGS. Of course, however, such communication networks 300 and 350 and others presented herein may be used in various applications and/or in permutations which may or may not be specifically described in the illustrative embodiments listed herein. Further, the communication networks 300 and 350 presented herein may be used in any desired environment.

Referring first to FIG. 3A, communication network 300 is located around the planet Earth 302. A first LEO satellite 304 orbits the Earth along an orbital path 306. A footprint coverage region 308 of the first satellite 304 changes as the first LEO satellite 304 orbits the Earth along an orbital path 306. For example, in FIG. 3A, the first LEO satellite 304 is shown in three different positions along the orbital path 306. At each of these locations, the footprint coverage region 308 of the first satellite 304 is within a predetermined proximity to portions 310 and 312 of land of the Earth. However, it may be noted that at each of these locations, the footprint coverage region 308 of the first satellite 304 is not within a predetermined proximity to bodies 314 and 316 of water of the Earth.

Referring now to FIG. 3B, communication network 350 is located around the planet Earth 302. In contrast to the position of the first LEO satellite 304 in FIG. 3A, in FIG. 3B, the footprint coverage region 308 of the first satellite 304 in each of three different locations is not within a predetermined proximity to portions 352 and 354 of land of the Earth. However, the footprint coverage region 308 of the first satellite 304 in each of three different locations is within a predetermined proximity to a body of water 356 of the Earth.

Figure 4:
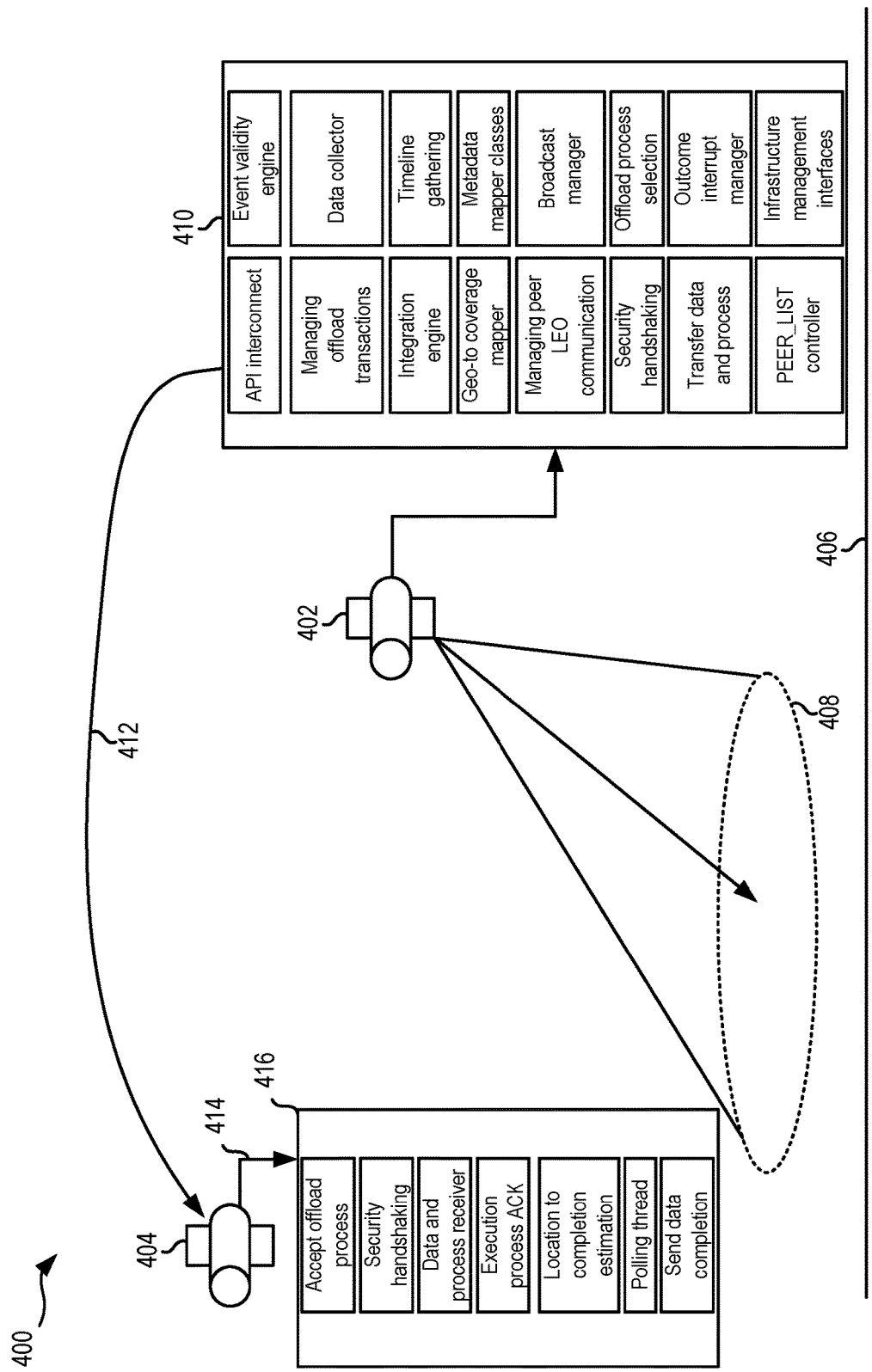
FIG. 4 is a depiction of a communication network, in accordance with one embodiment of the present invention.

FIG. 4 depicts a communication network 400, in accordance with one embodiment. As an option, the present communication network 400 may be implemented in conjunction with features from any other embodiment listed herein, such as those described with reference to the other FIGS. Of course, however, such communication network 400 and others presented herein may be used in various applications and/or in permutations which may or may not be specifically described in the illustrative embodiments listed herein. Further, the communication network 400 presented herein may be used in any desired environment.

Communication network 400 includes a first LEO satellite 402 and a second LEO satellite 404 that are both orbiting Earth's surface 406. The first LEO satellite has a footprint coverage region 408. A first job for the first satellite to offload to the second LEO satellite during a first period of time that the footprint coverage region of the first satellite is within a predetermined proximity to a first of the bodies of water may be determined. In some approaches, the first satellite uses a LEO offload initiator 410 in order to offload the first job to the second satellite, e.g., see operation 412. The LEO offload initiator 410 may have access to and/or use a plurality of components in order to perform the offload, e.g., see API interconnect, event validity engine, etc.

In some approaches, the first job is received by the second satellite. The second satellite may include a LEO eNodeB connection processor that may be idle until the first job is received. The second satellite may perform one or more operations for fulfilling the job. In some approaches, one of such operations includes offloading the first job to a target device that is located on Earth's surface, e.g., see operation 414. In some approaches, the second satellite may use a LEO offload target process 416 for offloading the first job. The LEO offload target process 416 may include one or more operations, e.g., see accept offload process, security handshaking, etc.

Figure 5:
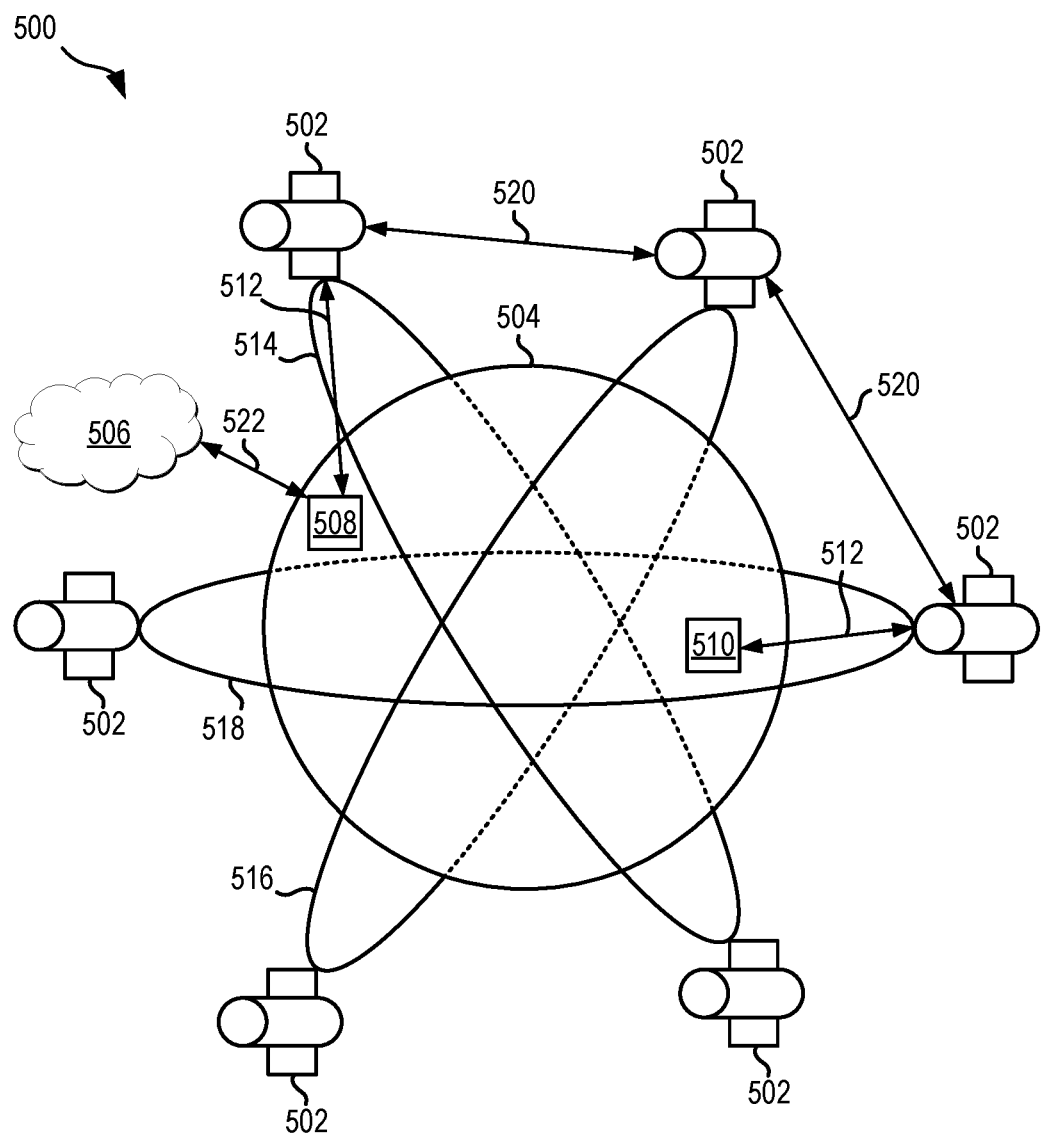
FIG. 5 is a depiction of a communication network, in accordance with one embodiment of the present invention.

FIG. 5 depicts a communication network 500, in accordance with one embodiment. As an option, the present communication network 500 may be implemented in conjunction with features from any other embodiment listed herein, such as those described with reference to the other FIGS. Of course, however, such communication network 500 and others presented herein may be used in various applications and/or in permutations which may or may not be specifically described in the illustrative embodiments listed herein. Further, the communication network 500 presented herein may be used in any desired environment.

The communication network 500 is based on communications that occur on Earth 504. The communication network 500 includes a plurality of satellites 502, which may be LEO satellites. Satellite information associated with the satellites 502 may be obtained. For example, at least one of the satellites may relay such information to other satellites via communication signals 520, and at least one of the satellites may output the satellite information to a satellite control and management ground junction component 508 and/or a field component 510, e.g., see operations 512. At least some of the satellite information may additionally and/or alternatively be received and/or output to an internet and/or private network 506, e.g., see operation 522. The satellite information may be used to generate temporal mappings that are used to ensure that satellites perform jobs for a period of time that their footprint coverage region is positioned over land, and offload jobs for a period of time that their footprint coverage region is positioned over predetermined bodies of water. For example, trajectories 514, 516, 518 of the satellites may be determined using the obtained satellite information.

Figure 6:
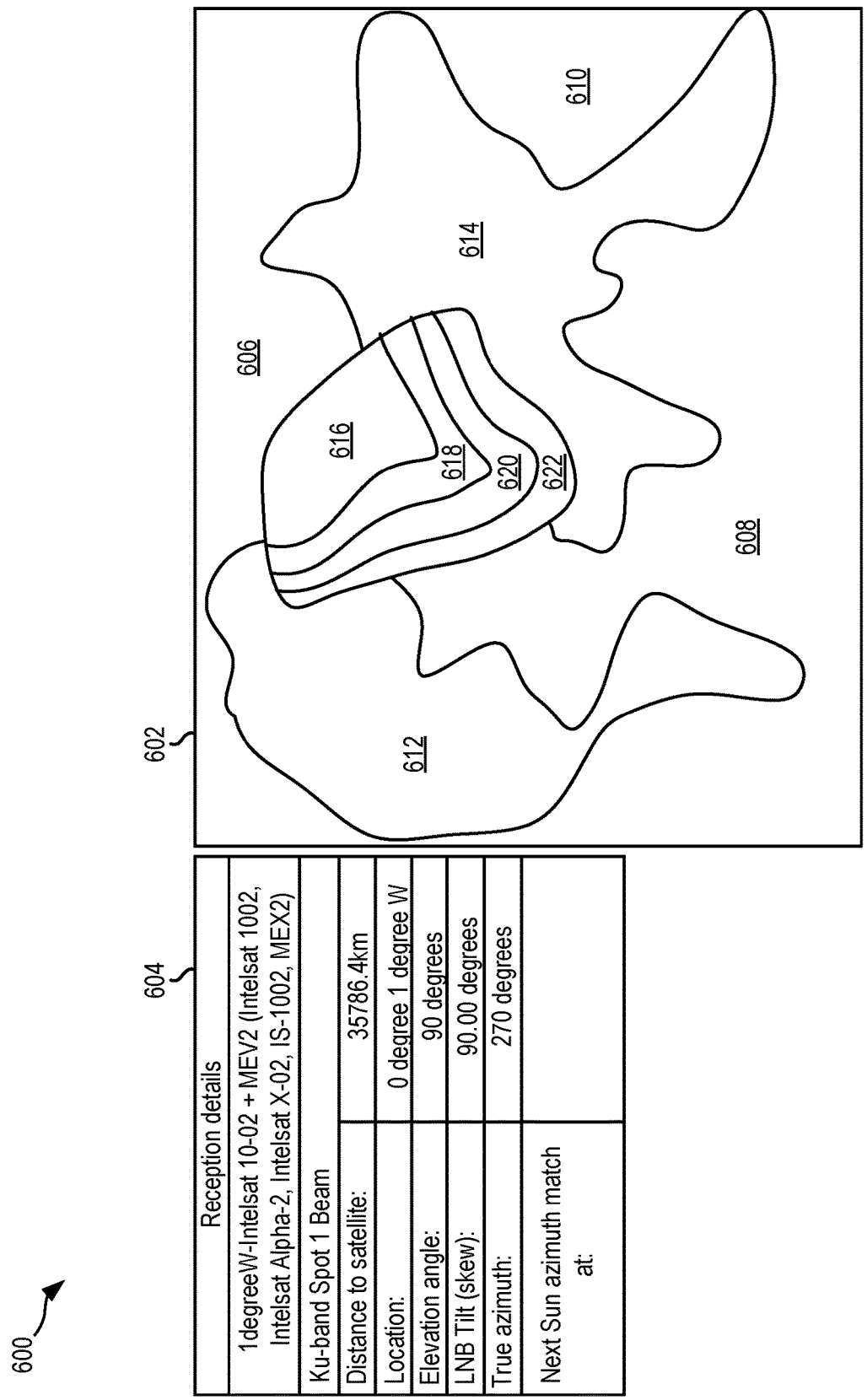
FIG. 6 is a graphical plot, in accordance with one embodiment of the present invention.

FIG. 6 depicts a graphical plot 600, in accordance with one embodiment. As an option, the present graphical plot 600 may be implemented in conjunction with features from any other embodiment listed herein, such as those described with reference to the other FIGS. Of course, however, such graphical plot 600 and others presented herein may be used in various applications and/or in permutations which may or may not be specifically described in the illustrative embodiments listed herein. Further, the graphical plot 600 presented herein may be used in any desired environment.

The graphical plot 600 includes a map portion 602 and a satellite information table 604. The map portion includes bodies of water 606, 608 and 610, and portions of land 612 and 614 of Earth. The graphical plot 600 also includes a plurality of different footprint coverage regions 616, 618, 620 and 622 of a first satellite. The satellite information table 604 includes information about the first satellite. For example, the satellite information table 604 includes locational information, reception details, elevation angles of the first satellite, etc. This information may be used to generate temporal mappings about the orbit of the first satellite around the Earth.

Figure 7:
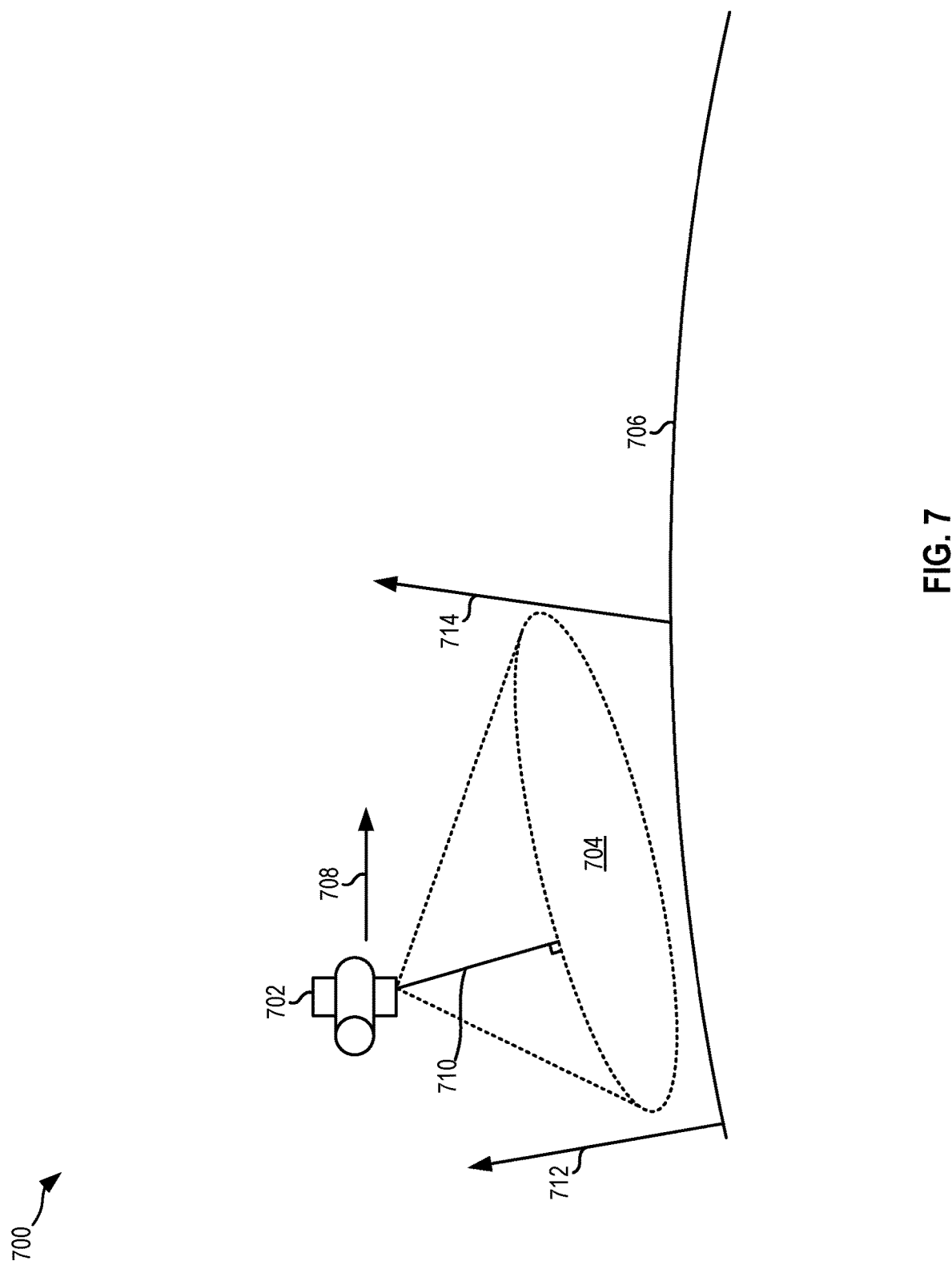
FIG. 7 is a depiction of a communication network, in accordance with one embodiment of the present invention.

FIG. 7 depicts a communication network 700, in accordance with one embodiment. As an option, the present communication network 700 may be implemented in conjunction with features from any other embodiment listed herein, such as those described with reference to the other FIGS. Of course, however, such communication network 700 and others presented herein may be used in various applications and/or in permutations which may or may not be specifically described in the illustrative embodiments listed herein. Further, the communication network 700 presented herein may be used in any desired environment.

The communication network 700 includes a first satellite 702 that has a footprint coverage region 704 that traverses over Earth's surface 706 as the first satellite orbits Earth. Satellite information associated with the first satellite may be determined and/or obtained in order to determine a temporal mapping of the first satellite. For example, such information may detail that the first satellite is traveling in a first direction 708 over Earth's surface 706 and/or a current altitude 710 of the first satellite with respect to an inference of the footprint coverage region. The temporal mapping may be used to determine at what time the footprint coverage region will no longer be within a predetermined proximity to a first portion of land, e.g., see first island boundary 712, and within a predetermined proximity to a second portion of land, e.g., see second island boundary 714.

Figure 8:
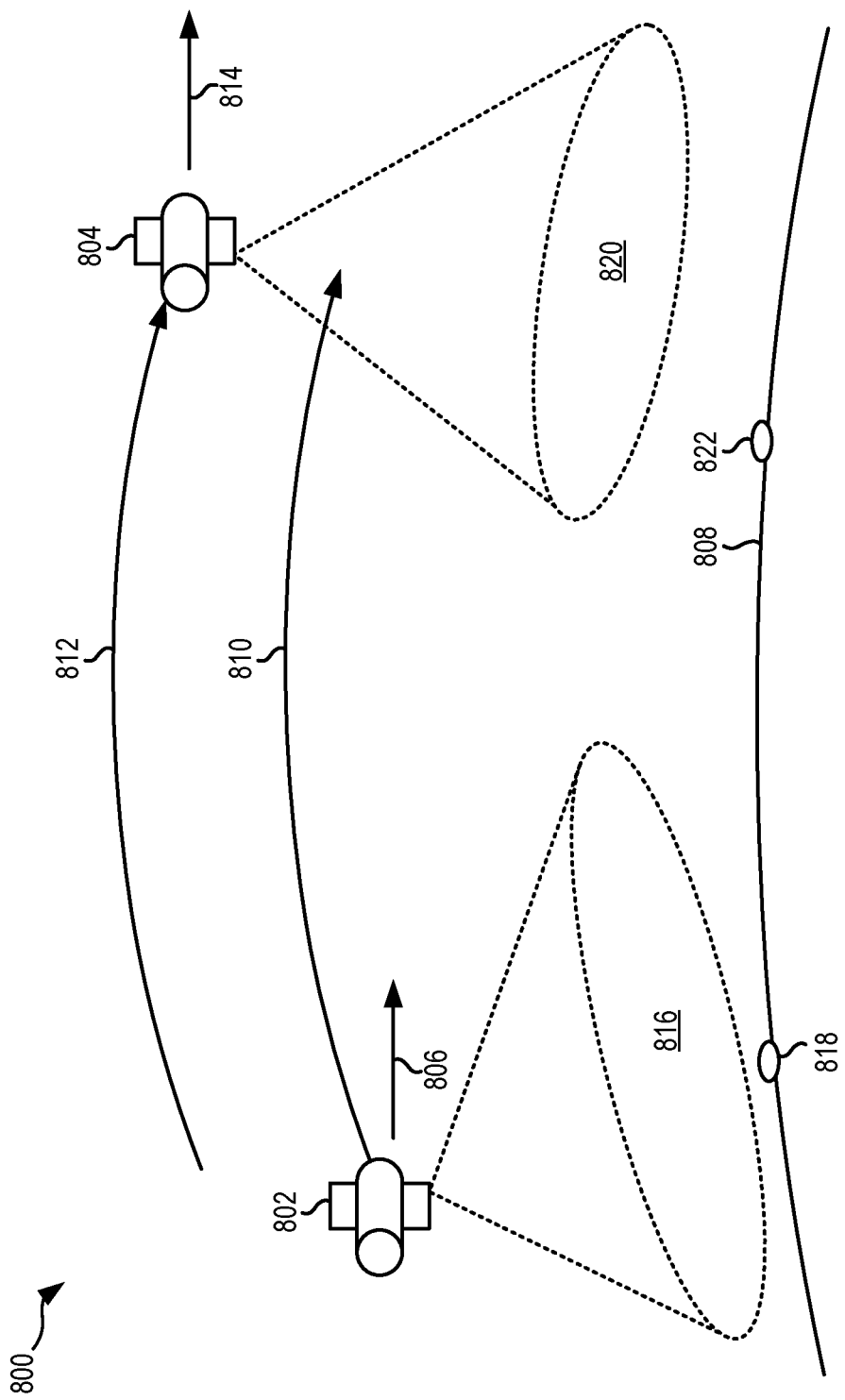
FIG. 8 is a depiction of a communication network, in accordance with one embodiment of the present invention.

FIG. 8 depicts a communication network 800, in accordance with one embodiment. As an option, the present communication network 800 may be implemented in conjunction with features from any other embodiment listed herein, such as those described with reference to the other FIGS. Of course, however, such communication network 800 and others presented herein may be used in various applications and/or in permutations which may or may not be specifically described in the illustrative embodiments listed herein. Further, the communication network 800 presented herein may be used in any desired environment.

The communication network 800 includes a plurality of satellites. For example, a first satellite 802 is traveling in a first direction 806 over Earth's surface 808. The first satellite travels along an orbital path 810, which may be a LEO in some approaches. Similarly, a second satellite 804 is traveling in a second direction 814 over Earth's surface 808. The second satellite travels along an orbital path 812, which may be a LEO in some approaches.

Information associated with the satellites may be used to generate temporal mappings of the satellites. In some approaches, the first satellite may offload a second job to the second satellite in response to a determination that a footprint coverage region 816 of the first satellite is within a predetermined proximity to a first body of water 818. In response to a determination that the footprint coverage region of the first satellite is within the predetermined proximity to the first body of water, the first satellite is caused to offload the first job to the second satellite. In some approaches, the first job is offloaded to the second satellite in response to a determination that a footprint coverage region 820 of the second satellite is within a predetermined proximity to a first portion of land 822.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a temporal mapping of positions of a first satellite with respect to predetermined portions of land of Earth and predetermined bodies of water of the Earth;
   determining, based on the temporal mapping, a first job for the first satellite to offload to a first target device during a first period of time that a footprint coverage region of the first satellite is within a predetermined proximity to a first of the bodies of water; and
   in response to a determination that the footprint coverage region of the first satellite is within the predetermined proximity to the first body of water, causing the first satellite to offload the first job to the first target device.

2. The computer-implemented method of claim 1, comprising:
   determining, based on the temporal mapping, a second job for the first satellite to fulfill during a second period of time that the footprint coverage region of the first satellite is within the predetermined proximity to a first of the portions of land; and
   in response to a determination that the footprint coverage region of the first satellite is within the predetermined proximity to the first portion of land, causing the first satellite to fulfill the second job.

3. The computer-implemented method of claim 1, wherein the first satellite is a low Earth orbit (LEO) satellite, wherein the first target device is a LEO satellite.

4. The computer-implemented method of claim 1, comprising:
   obtaining satellite information associated with a plurality of other satellites;
   determining, using the obtained satellite information, a temporal mapping of positions of the other satellites with respect to predetermined portions of land of the Earth and predetermined bodies of water of the Earth; and
   selecting a first of the other satellites as the first target device for offloading a second job to during a second period of time.

5. The computer-implemented method of claim 4, wherein the first other satellite is selected for offloading the second job to in response to a determination that a footprint coverage region of the first other satellite is within a predetermined proximity to a first of the portions of land during the first period of time.

6. The computer-implemented method of claim 1, comprising: determining the footprint coverage region of the first satellite, wherein the footprint coverage region of the first satellite is determined based on metrics associated with the first satellite selected from the group consisting of: a current altitude, a trajectory, orbital plane information and an average moving speed.

7. The computer-implemented method of claim 1, wherein predetermined portions of land are continents of the Earth, wherein the predetermined bodies of water are oceans of the Earth.

8. The computer-implemented method of claim 1, comprising:
receiving, from a second satellite, a request to offload a second job to the first satellite;
in response to a determination that the footprint coverage region of the first satellite is within the predetermined proximity to a first of the portions of land, causing the first satellite to accept the second job; and
causing the first satellite to initiate performance of the second job.

9. The computer-implemented method of claim 8, comprising:
in response to a determination that the footprint coverage region of the first satellite will be within the predetermined proximity to a second body of water before completion of the second job, determining a third satellite to offload a remaining portion of the second job to,
wherein a footprint coverage region of the third satellite is within at least a predetermined proximity to the first portion of land upon the footprint coverage region of the first satellite entering within the predetermined proximity to the second body of water; and
in response to a determination that the first satellite enters within the predetermined proximity to the second body of water, causing the first satellite to offload the remaining portion of the second job to the third satellite.

10. A computer program product, the computer program product comprising a computer readable storage medium having program instructions embodied therewith, the program instructions readable and/or executable by a processing circuit to cause the processing circuit to:
generate a temporal mapping of positions of a first satellite with respect to predetermined portions of land of Earth and predetermined bodies of water of the Earth;
determine, based on the temporal mapping, a first job for the first satellite to offload to a first target device during a first period of time that a footprint coverage region of the first satellite is within a predetermined proximity to a first of the bodies of water; and
in response to a determination that the footprint coverage region of the first satellite is within the predetermined proximity to the first body of water, cause the first satellite to offload the first job to the first target device.

11. The computer program product of claim 10, the program instructions readable and/or executable by the processing circuit to cause the processing circuit to:
determine, based on the temporal mapping, a second job for the first satellite to fulfill during a second period of time that the footprint coverage region of the first satellite is within the predetermined proximity to a first of the portions of land; and
in response to a determination that the footprint coverage region of the first satellite is within the predetermined proximity to the first portion of land, cause the first satellite to fulfill the second job.

12. The computer program product of claim 10, wherein the first satellite is a low Earth orbit (LEO) satellite, wherein the first target device is a LEO satellite.

13. The computer program product of claim 10, the program instructions readable and/or executable by the processing circuit to cause the processing circuit to:
obtain satellite information associated with a plurality of other satellites;
determine, using the obtained satellite information, a temporal mapping of positions of the other satellites with respect to predetermined portions of land of the Earth and predetermined bodies of water of the Earth; and
select a first of the other satellites as the first target device for offloading a second job to during a second period of time.

14. The computer program product of claim 13, wherein the first other satellite is selected for offloading the second job to in response to a determination that a footprint coverage region of the first other satellite is within a predetermined proximity to a first of the portions of land during the first period of time.

15. The computer program product of claim 10, the program instructions readable and/or executable by the processing circuit to cause the processing circuit to: determine the footprint coverage region of the first satellite, wherein the footprint coverage region of the first satellite is determined based on metrics associated with the first satellite selected from the group consisting of: a current altitude, a trajectory, orbital plane information and an average moving speed.

16. The computer program product of claim 10, wherein predetermined portions of land are continents of the Earth, wherein the predetermined bodies of water are oceans of the Earth.

17. The computer program product of claim 10, the program instructions readable and/or executable by the processing circuit to cause the processing circuit to:
receive, from a second satellite, a request to offload a second job to the first satellite;
in response to a determination that the footprint coverage region of the first satellite is within the predetermined proximity to a first of the portions of land, cause the first satellite to accept the second job; and
cause the first satellite to initiate performance of the second job.

18. The computer program product of claim 17, the program instructions readable and/or executable by the processing circuit to cause the processing circuit to:
in response to a determination that the footprint coverage region of the first satellite will be within the predetermined proximity to a second body of water before completion of the second job, determine a third satellite to offload a remaining portion of the second job to,
wherein a footprint coverage region of the third satellite is within at least a predetermined proximity to the first portion of land upon the footprint coverage region of the first satellite entering within the predetermined proximity to the second body of water; and
in response to a determination that the first satellite enters within the predetermined proximity to the second body of water, cause the first satellite to offload the remaining portion of the second job to the third satellite.

19. A system, comprising:
a processor; and
logic integrated with the processor, executable by the processor, or integrated with and executable by the processor, the logic being configured to:

generate a temporal mapping of positions of a first satellite with respect to predetermined portions of land of Earth and predetermined bodies of water of the Earth;

determine, based on the temporal mapping, a first job for the first satellite to offload to a first target device during a first period of time that a footprint coverage region of the first satellite is within a predetermined proximity to a first of the bodies of water; and in response to a determination that the footprint coverage region of the first satellite is within the predetermined proximity to the first body of water, cause the first satellite to offload the first job to the first target device.

20. The system of claim 19, the logic being configured to:

determine, based on the temporal mapping, a second job for the first satellite to fulfill during a second period of time that the footprint coverage region of the first satellite is within the predetermined proximity to a first of the portions of land; and in response to a determination that the footprint coverage region of the first satellite is within the predetermined proximity to the first portion of land, cause the first satellite to fulfill the second job.

\* \* \* \* \*